(12) United States Patent
Stark et al.

(10) Patent No.: US 11,280,222 B2
(45) Date of Patent: Mar. 22, 2022

(54) BULKHEAD SHIMS FOR CURVILINEAR COMPONENTS

(71) Applicant: The Boeing Company, Chicago, IL (US)

(72) Inventors: Rich L. Stark, Mount Pleasant, SC (US); Branko Lakic, Mukilteo, WA (US); Jared Marvin Pasik, Ladson, SC (US); Daniel D. Williams, Ladson, SC (US)

(73) Assignee: The Boeing Company, Chicago, IL (US)

( * ) Notice: Subject to any disclaimer, the term of this patent is extended or adjusted under 35 U.S.C. 154(b) by 150 days.

(21) Appl. No.: 16/285,798

(22) Filed: Feb. 26, 2019

(65) Prior Publication Data
US 2020/0271016 A1     Aug. 27, 2020

(51) Int. Cl.
*F01D 25/24* (2006.01)
*B64D 27/10* (2006.01)
(Continued)

(52) U.S. Cl.
CPC ............. *F01D 25/24* (2013.01); *B64D 27/10* (2013.01); *B23P 19/10* (2013.01); *B64C 1/10* (2013.01); *B64D 29/06* (2013.01)

(58) Field of Classification Search
CPC ...... F01D 25/24; B23P 19/10; B23P 2700/01; B64D 29/06; B64D 27/10; B64D 33/02;
(Continued)

(56) References Cited

U.S. PATENT DOCUMENTS

| 6,328,258 B1 | 12/2001 | Porte | |
|---|---|---|---|
| 2011/0185555 A1* | 8/2011 | Gallant | B64C 1/069 29/428 |

(Continued)

FOREIGN PATENT DOCUMENTS

| EP | 2727821 A1 | 5/2014 |
|---|---|---|
| EP | 3287622 A1 | 8/2017 |
| EP | 3434459 A | 7/2018 |

OTHER PUBLICATIONS

Office Action for related European Application No. 20153952.5; report dated Jul. 27, 2020.

*Primary Examiner* — J. Todd Newton
*Assistant Examiner* — Jesse M Prager
(74) *Attorney, Agent, or Firm* — Quinn IP Law

(57) ABSTRACT

A method of assembling thin-walled curvilinear components to a bulkhead offers a cost-effective, time-saving process of manufacture. Each component includes a faying edge configured to be aligned with respect to the other. A first component and the bulkhead are preassembled. In one approach, a second component is clamped about the bulkhead for a preassembly measurement of radial gaps between the faying edge of the second component and the bulkhead. An average value of the radial gaps is calculated, and a specific shim thickness corresponding to the calculated average gap value is selected. The second component is unclamped, and a plurality of shims, each having the selected thickness corresponding to the calculated average gap value, is applied about the bulkhead. The second component is then permanently secured to the bulkhead over the shims, with respective faying edges of the first and second components fixed in radial alignment with each other.

12 Claims, 9 Drawing Sheets

(51) Int. Cl.
*B23P 19/10* (2006.01)
*B64C 1/10* (2006.01)
*B64D 29/06* (2006.01)

(58) Field of Classification Search
CPC ........ B64C 1/10; B64F 5/10; Y10T 29/49778; Y10T 29/4978; Y10T 29/49899; F02C 7/04
See application file for complete search history.

(56) References Cited

U.S. PATENT DOCUMENTS

| | | |
|---|---|---|
| 2014/0093362 A1* | 4/2014 | Pickens .................. F01D 25/24 |
| | | 415/182.1 |
| 2015/0129045 A1 | 5/2015 | Kane et al. |
| 2015/0314850 A1 | 11/2015 | Lumbab et al. |
| 2017/0132355 A1* | 5/2017 | Vasquez .................. B64C 1/26 |
| 2017/0178898 A1* | 6/2017 | Kang .................. H01L 21/0228 |
| 2018/0067476 A1* | 3/2018 | Engelbart .............. B33Y 50/02 |
| 2018/0208328 A1* | 7/2018 | Charlton ................ B23B 49/00 |

* cited by examiner

BULKHEAD SHIMS FOR CURVILINEAR COMPONENTS

FIELD

The present disclosure relates generally to aircraft manufacturing, and more specifically to optimizing processes for avoiding aerodynamic steps between adjoining thin-walled curvilinear components attached to structural supports such as bulkheads.

BACKGROUND

Aerodynamic, also known as "wetted", exterior surfaces of aircraft can experience significant manufacturing tolerance variations during component fit-up. If gaps at faying edges (i.e. fastening joints) are fixed and/or locked in place with contoured fillers or shims, resulting variations can create turbulent air flows which may create erosion of aft joint surfaces. When the components are formed of composite materials, the erosion may actually produce delamination. As a result, special care must be taken in the manufacture of faying edges of wetted aircraft components at risk for erosion damage.

Such risks may be somewhat greater for certain thin-walled curvilinear aircraft components, including engine nacelle lipskins, leading edges of wings, and wetted areas aft of fuselage joints. To avoid critical damage, such thin-walled structures including the noted nacelle lipskins, for example, have been fitted with shims for assuring desired positioning of the thin-walled structures on underlying support structures such as bulkheads.

Methods of applying the shims, generally referred to as "shimming", have traditionally required relatively tedious efforts to achieve desired levels of precision. Generally, custom contoured shims have been employed, even though applications of the latter have tended to be expensive and time-consuming.

Thus, there has been a continuing need to develop less expensive and more time-saving shimming methods and systems.

SUMMARY

In accordance with one aspect of the present disclosure, a method is disclosed of assembling first and second curvilinear components to a bulkhead, with the first component having a faying edge axially spaced and radially aligned with a faying edge of the second component. The method includes preassembling the first component to the bulkhead, and then conducting a preassembly measurement of radial gaps between the bulkhead and faying edge of the second component. The preassembly measurement is achieved by applying predictive analytics to calculate an average value of radial gaps extending circumferentially between the second component and the bulkhead. A specific shim thickness, selected from among prefabricated sets of shims, corresponds closest to the calculated average value of all radial gaps. A plurality of shims of the specific thickness selected is then applied to the bulkhead in a position prospectively determined to be under the edge of the second component, with each shim spaced circumferentially about the bulkhead. The second of the components is then permanently secured to the bulkhead in a manner such that the faying edges of the first and second components are fixed in radial alignment with each other.

In accordance with another aspect of the present disclosure, a method is disclosed of assembling first and second thin-walled curvilinear components to a support structure having an axis, each component defining a faying edge, the faying edges axially spaced from and radially aligned with respect to the other. The method includes preassembling the first component to the support structure. The second component is then clamped to the support structure with the faying edge of the second component axially spaced from the faying edge of the first component, and a preassembly measurement is made of all radial gaps between the second component and the support structure at the faying edge of the second component. An average value of the radial gaps is calculated, and a shim thickness corresponding to the calculated average value of the radial gaps is determined. Next, the second component is unclamped to separate the edge of the second component from the support surface, and a plurality of shims is applied to the support structure, with each shim spaced circumferentially about the support structure, each shim having a thickness corresponding to the calculated average value of the radial gaps. Finally, the second component is secured to the support structure, such that the faying edges of the first and second components are permanently fixed in radial alignment with each other.

In accordance with yet another aspect of the present disclosure, an assembly, formed as a product-by-process, includes first and second curvilinear aircraft components secured to a bulkhead, the components each defining a faying edge axially spaced from and radially aligned with the other. The first component is preassembled to the bulkhead; the second component is then separately assembled to the bulkhead after conducting a preassembly measurement of gaps between the faying edge of the second component and the bulkhead. For this purpose, a predictive analytics model is applied to calculate average value of all radial gaps, and a specific shim thickness closest to one that corresponds to the calculated average gap value is selected from among prefabricated sets of shims A plurality of shims from one of the sets is circumferentially applied to the bulkhead, with each shim from the one set having an identical thickness corresponding to the average gap value. The second component is then permanently secured to the bulkhead in a manner such that the faying edges of the first and second components are fixed in radial alignment with each other.

The features, functions, and advantages disclosed herein can be achieved independently in various embodiments or may be combined in yet other embodiments, the details of which may be better appreciated with reference to the following description and drawings.

DETAILED DESCRIPTION

The following detailed description includes methods as well as a product-by-process aspect for carrying out the present disclosure. Actual scope of the disclosure is as defined in the appended claims.

Figure 1:
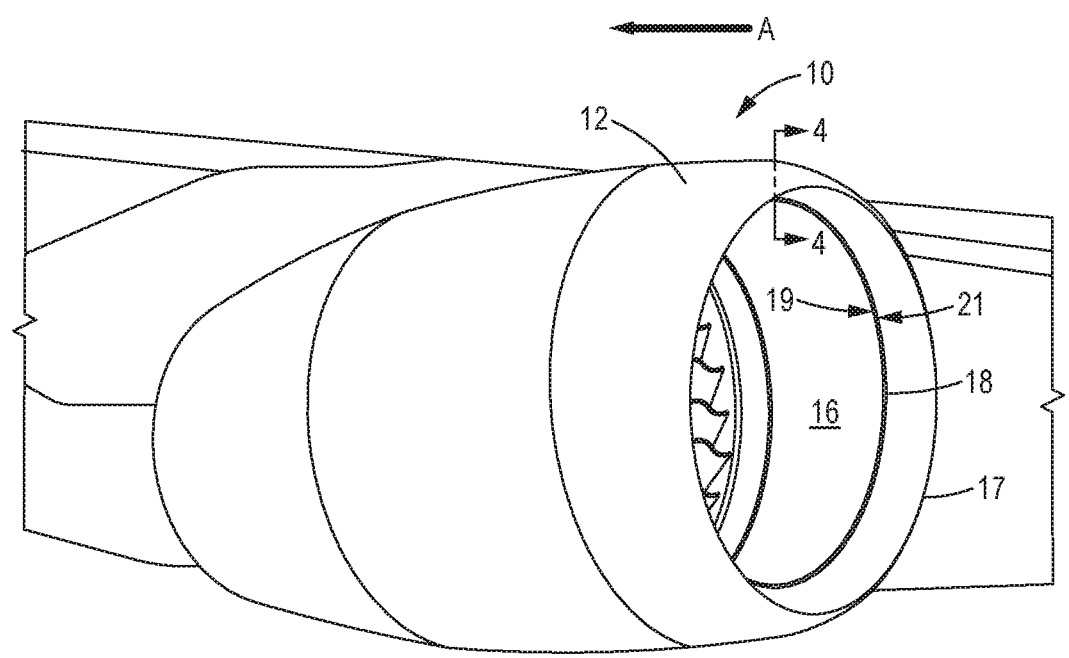
FIG. 1 is a perspective schematic view of an aircraft turbofan jet engine that includes assembled nacelle lipskin and inner barrel components, each component having a faying edge assembled in accordance with the present disclosure.
Figure 3:
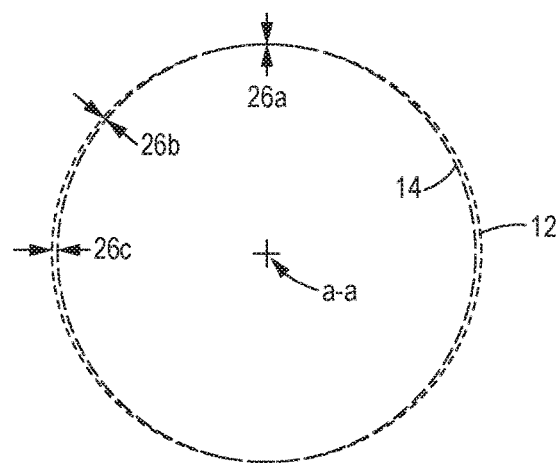
FIG. 3 is a schematic view exemplifying variations of the radial gaps of FIGS. 2A, 2B, and 2C that may occur about the faying edges of the nacelle lipskin relative to the bulkhead.

Referring initially to FIG. 1, an aircraft turbofan jet engine 10 of the type utilized on a commercial jet airliner (not shown) includes a nacelle lipskin 12 mounted directly to a jet engine bulkhead 14 (hidden in FIG. 1, but shown in FIG. 3). The bulkhead 14 defines an axis "a-a" (FIG. 3), and the lipskin 12 along with an inner barrel 16, situated adjacent to the lipskin 12, are both curvilinear components of a type that may be axially and radially secured to the bulkhead 14, utilizing methods disclosed herein. The bulkhead 14, as a critical support structure, may be formed of a metal, such as titanium or aluminum. The lipskin 12 will also normally be formed of a relatively thin-walled metal of aluminum alloy, so as to be able to withstand high temperature engine bleed air typically ducted through a leading edge 17 of the lipskin for deicing purposes during flight in known icing conditions. The inner barrel 16, however, in the examples provided herein, is formed of a relatively light weight, but relatively rigid, composite material, and is secured to the bulkhead 14 in a preassembly process not described herein, although well known to those skilled in the art.

It is desirable that the lipskin 12 and the inner barrel 16 be axially spaced a slight distance apart, principally due to their differences in coefficients of expansion. As a result, an edge 19 of the lipskin 12 is ideally axially spaced from an edge 21 of the inner barrel 16 by a distance ranging from 30 to 150 thousandths of an inch, to accommodate axial expansion of the metal edge 19 of the lipskin 12 relative to the composite edge 21 of the inner barrel 16. An arrow A indicates the relative movement of airflow over a so-called wetted faying joint 18, which includes the described axially spaced edges 19 and 21. In the manufacture of aerodynamic, or "wetted" joints, special care must be taken to avoid so-called aerodynamic steps, which can create erosion of areas aft of joints, such as the faying joint 18, particularly when affected downstream structures are formed of composites. Such erosion may actually create significant damage, including delamination of the composite material.

Figure 2A:
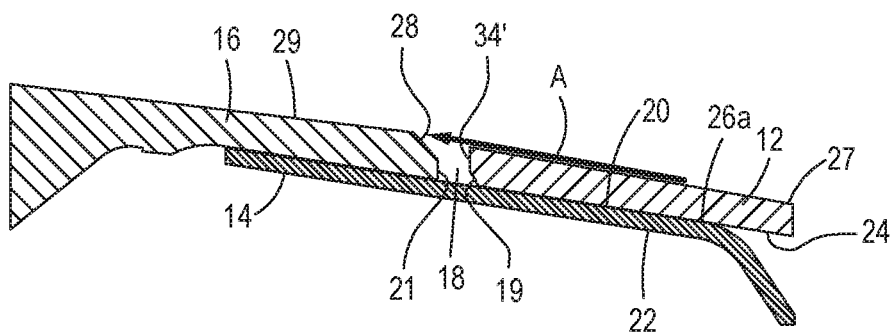
FIG. 2A is a cross-sectional side view of a nacelle lipskin secured to a bulkhead, revealing one type of radial offset between faying edges of the lipskin and inner barrel that creates an undesirable aerodynamic step between their faying edges.
Figure 2B:
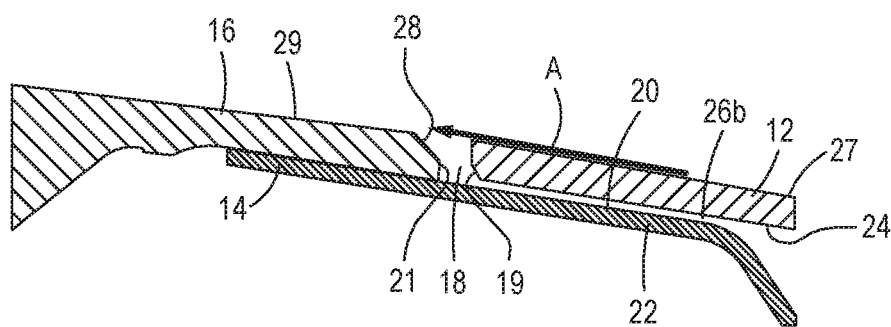
FIG. 2B is a cross-sectional side view of a nacelle lipskin secured to a bulkhead, revealing no radial offset between faying edges of lipskin and inner barrel components.
Figure 2C:
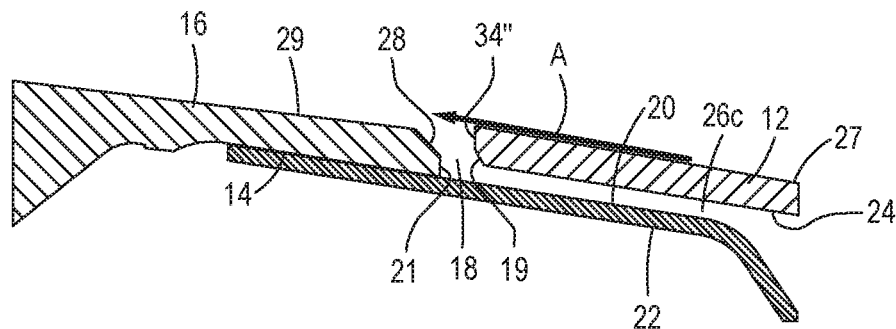
FIG. 2C is a cross-sectional side view of a nacelle lipskin secured to a bulkhead, revealing another type of radial offset between faying edges of the lipskin an inner barrel that also creates an undesirable aerodynamic step between their faying edges.

Referring now to FIGS. 2A, 2B, and 2C, three representative cross-sections of the circumferentially extending faying joint 18 reveal an aerodynamic steps 34' as a positive step in FIG. 2A. FIG. 2B depicts a virtual absence of any aerodynamic step, while FIG. 2C depicts a negative aerodynamic step 34". Aerodynamic steps are created by radial offsets of the axially spaced faying edges 19 and 21, as measured at outside diameters 27 and 29 of the nacelle lipskin 12 and inner barrel 16, respectively. A step is identified as positive if the airstream (shown as arrow A) passes over the outside diameter 27 of the nacelle lipskin 12, but directly impinges on the edge 21 of the inner barrel 16. In fact, the edge 21 includes a chamfer 28 to minimize effects of faying joint erosion earlier described. Conversely, a step is identified as negative if the airstream passes over the outside diameter 27 of the nacelle lipskin 12 and flows radially above the edge 21 of the inner barrel 16, as shown in FIG. 2C. Those skilled in the art will appreciate that neither a positive or negative aerodynamic step is acceptable if outside of certain structural limits.

The amount of aerodynamic step 34' or 34" is controlled by managing the circumferentially extending radial gaps 26a, 26b, and 26c, each gap delimited by an outer diameter 20 of the bulkhead 14 and an inner diameter 24 of the nacelle lipskin 12, as shown respectively in FIGS. 2A, 2B, and 2C. It is noteworthy that the various gaps 26a, 26b, and 26c should not be confused with, nor do they directly correlate with, the positive or negative aerodynamic steps 34' and 34". For example, although the indicated gap 26a of FIG. 2A is virtually nonexistent, it is associated with the described positive step 34'. On the other hand, the lack of aerodynamic step in FIG. 2B correlates with a discernible gap 26b; while the negative aerodynamic step 34" is associated with an even larger gap 26c.

Referring now also to FIG. 3, the methods of this disclosure offer effective control of depicted gaps 26a, 26b, and 26c, as well as of all others that may exist between the circumference of the nacelle lipskin 12 and the bulkhead 14, in a manner that is more cost-effective and considerably less time-consuming than previous methods. Moreover, the methods disclosed herein, which can be generally referred to as "average thickness shimming", are particularly advantageous in situations wherein one axially spaced component is rigid, i.e. the inner barrel 16, while the other component, i.e. the thin-walled lipskin 12, is relatively compliant and/or flexible.

Figure 4:
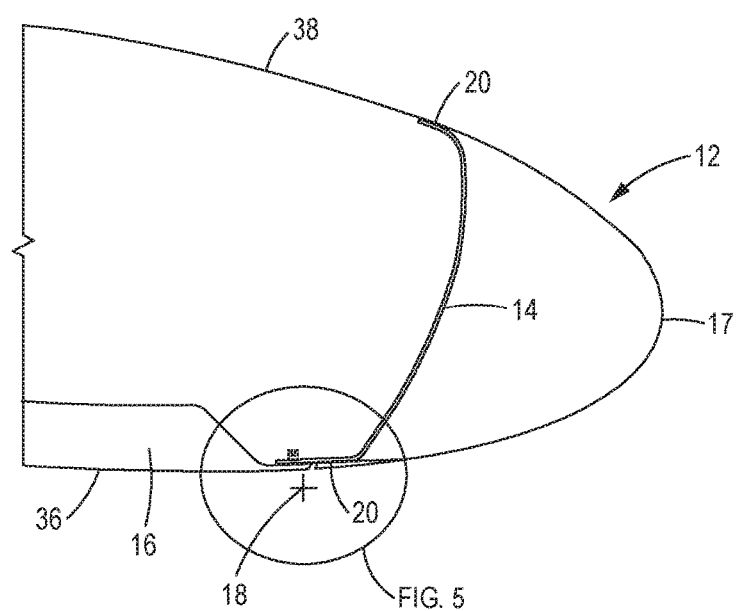
FIG. 4 is a cross-sectional view of a portion of the nacelle lipskin and inner barrel, taken along lines 4-4 of FIG. 1.

Referring now also to FIG. 4, a cross-section of the nacelle lipskin 12 and adjacent inner barrel 16, taken along lines 4-4 of FIG. 1, reveals the circumferential faying joint 18, as situated on an air inlet diameter 36 of the nacelle lipskin 12. The nacelle lipskin inlet is treated herein as just one representative embodiment by which to describe the methods of this disclosure. Similar faying joints, such as that situated on the exterior or outside cowling 38 of the jet engine 10, could be described similarly.

Figure 5:
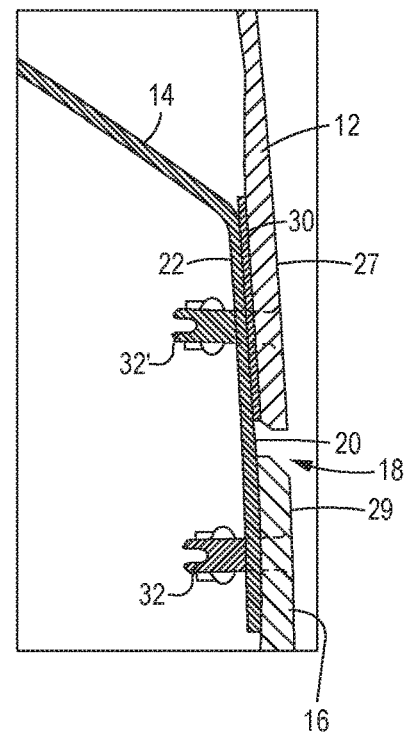
FIG. 5 is a an enlarged cross-sectional view, taken as an inset from FIG. 4, of a nacelle lipskin and inner barrel, both secured to a bulkhead, and including a shim applied between the nacelle lipskin and the bulkhead, in accordance with the present disclosure.

Referring now specifically to FIG. 5, a shim 30, which will be described in further detail below, is shown as applied between the bulkhead 14 and the nacelle lipskin 12, for the purpose of minimizing/reducing positive or negative aerodynamic steps 34' and 34" that may otherwise exist circumferentially about the faying joint 18. Also shown in FIG. 5 are fasteners 32 used to secure the bulkhead 14 and inner barrel 16 together, as well as fasteners 32' used to secure the bulkhead 14 and nacelle lipskin 12 together with the shim 30 sandwiched between the latter elements and functioning as a spacer. Though mounted flush with the outer diameter 27 of the nacelle lipskin 12, as well as with the outer diameter 29 of the inner barrel 16, the fasteners 32, 32' may physically extend into a space defined by an inner diameter 22 of the bulkhead 14, as shown.

Figure 6:
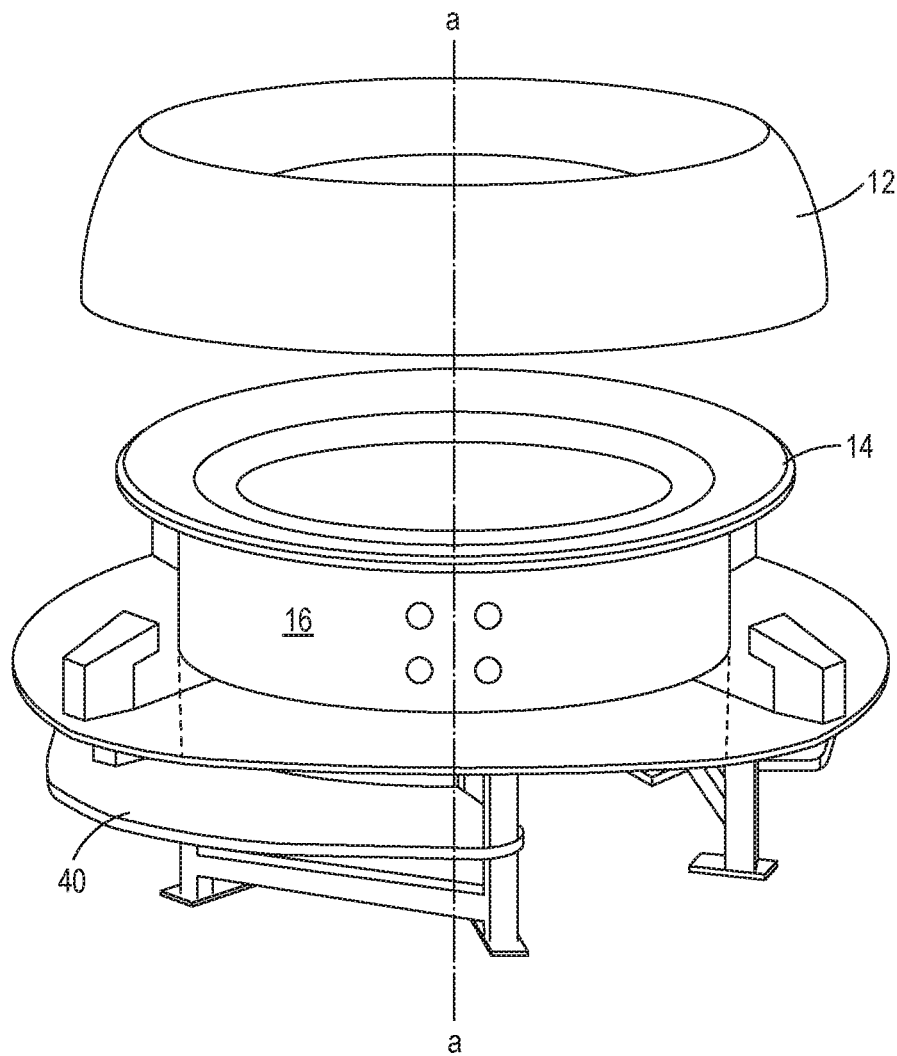
FIG. 6 is a perspective exploded schematic view of a nacelle lipskin, an inner barrel, and a bulkhead, all supported on a subassembly tool in accordance with one method of the present disclosure.

Referring to FIG. 6, a subassembly tool 40 enables the nacelle lipskin 12 to be installed vertically onto a bulkhead 14, in a position adjacent to a composite inner barrel 16, the latter having already been preassembled to the bulkhead 14. In FIG. 6, the axis a-a is shown as common to the nacelle lipskin 12, the bulkhead 14, and the composite inner barrel 16. Since lipskin and inner barrel components are both fixed to the bulkhead, each of the bulkhead, inner barrel, and lipskin components will share the common axis a-a in their final assembled form.

The methods presented herein are predicated on having a preassembled metallic bulkhead 14 already containing an inner barrel 16 formed of a composite material. Such approach has been found to be advantageous, particularly where the bulkhead 14 can be preassembled as several unitary pieces with the inner barrel 16.

Figure 7:
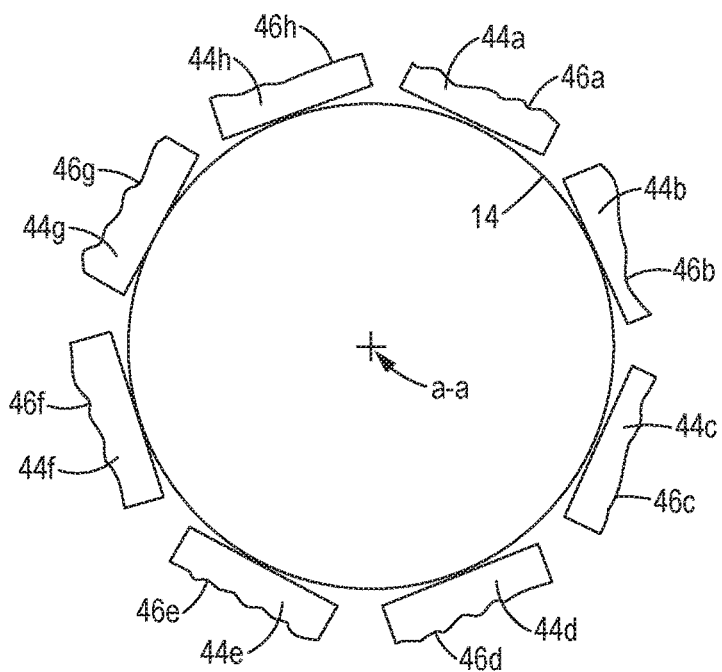
FIG. 7 is a cross-sectional frontal view of a bulkhead, depicting custom contoured shims traditionally utilized in accordance with prior art methods.

Referring to FIG. 7, a prior art array of contoured shims 44a through 44h, each containing varied exterior contours 46a through 46h in accordance with prior art gap control practices, are shown as applied to a bulkhead 14. The variability of the shims 44a through 44h, each having its own unique thickness and individually shaped exterior contour (i.e. one of contours 46a through 46h), demonstrates an undesirable complexity associated with prior art practice. Traditional aerospace structures have been joined together utilizing assembly tooling, with each set-up utilizing clamp-up loads of no greater than 5 pounds per linear foot. In highly contoured components, such as lipskins, for example, the traditional process of alleviating tapered gaps at faying edges has involved uses of such custom shims, resulting in inefficient cycle times, burdensome labor, and expensive equipment used for fabrication. Although newer technologies have enabled uses of predictive shim geometry to minimize amount of labor, such processes have required expensive and skilled metrology, along with specialized uses of CNC equipment. As such, the traditional approach has been considered to be cost prohibitive for sustaining high production rates.

Figure 8:
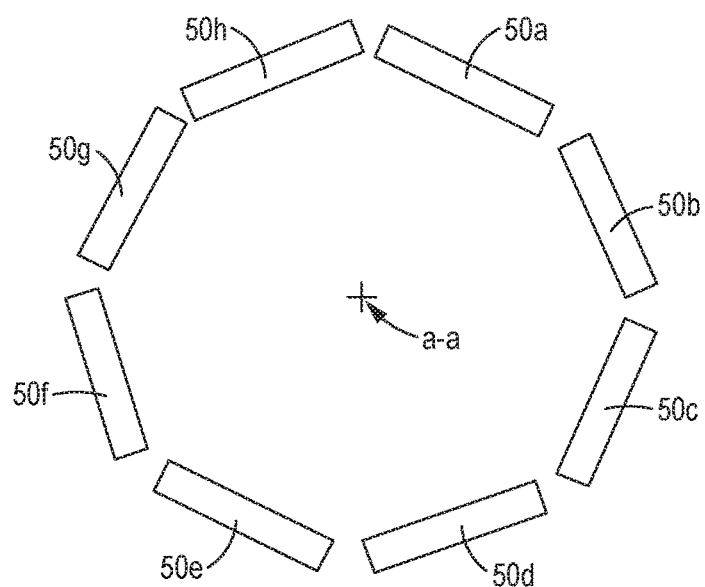
FIG. 8 is a cross-sectional view of constant thickness shims, as may be constructed and applied in lieu of prior art custom contoured shims, in accordance with the present disclosure.

Referring to FIG. 8, this disclosure provides a means to replace custom contoured shims 44a-h of the prior art (FIG. 7) with a plurality of equal-thickness flat standard shim stock, such as the shims 50a through 50h of FIG. 8. Thus, this disclosure provides methods by which simple prefabricated same-thickness shims 50a through 50h (similar to the single shim 30 of FIG. 5) can be readily used in applications requiring attachments of thin-walled components, including wing skins, leading edge skins, fuselage, and nacelle lipskins, to bulkheads. The compliance of thin-walled metal structures allows airfoil surfaces to "drape" over attachment hard points, such as bulkheads. The use of flat shim stock instead of custom contoured shims eliminates shim fabrication techniques that include the CNC machine time and labor earlier noted. Moreover, the flat shims 50a-h can be stored at points-of-use, thus eliminating a need for working inventory buffers. The shim material can be metal or a composite such as fiberglass or the like.

Figure 9:
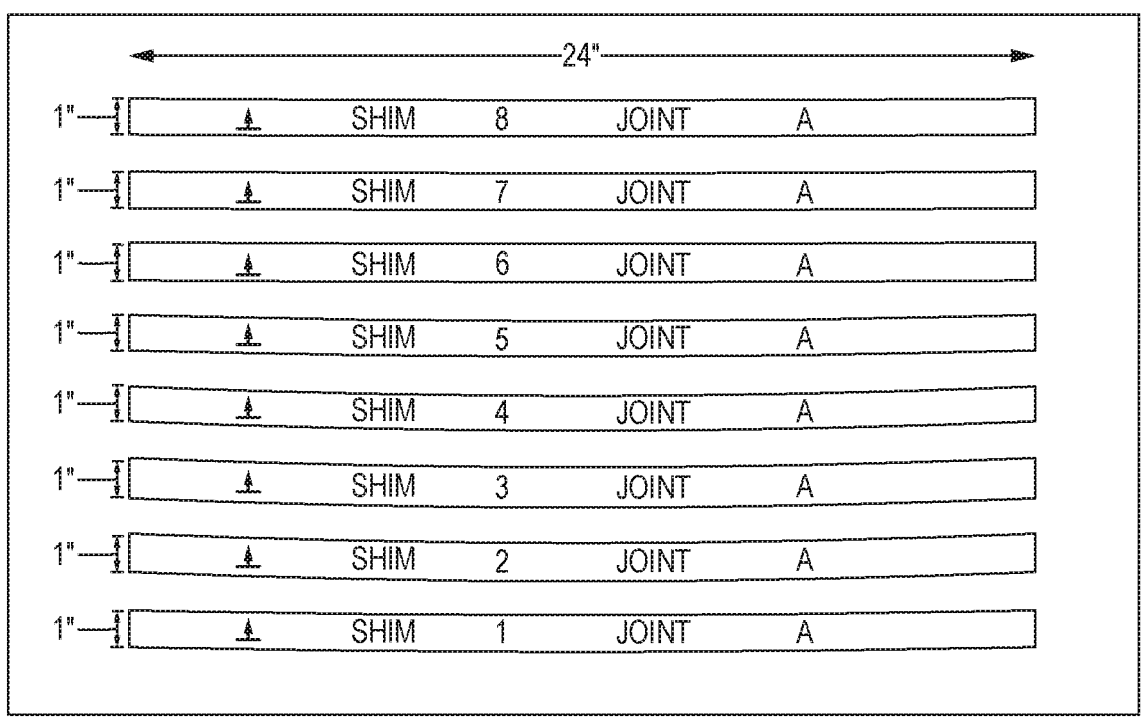
FIG. 9 is a schematic rendition of prefabricated sets of shims of different thicknesses, and from which specific shim thickness selections may be retrieved, each set containing shims of an identical thickness, in accordance with the present disclosure.

In one aspect, assuming just by way of example that nacelle lipskin 12 of the turbofan jet engine 10 has a thickness of between 0.060 and 0.120 inch and an air inlet diameter 36 of approximately 72 inches, the shims 50a through 50h may be formed of a fiberglass, each shim 50a through 50h having a length of 2 feet and a width of 1 inch, as depicted in FIG. 9. Sets of variable-thickness shims, schematically reflected as Shims 1 through 8 in FIG. 9, include shims of different thickness, each set being of one specific thickness, and provided as part of a prefabricated inventory stock from which shims having specific thickness may be selected. From among the selectable choices, a unit-to-unit shim thickness variation of between 0.010 and 0.060 inch is available. Incremental thickness variations between the sets of shims are approximately 0.005 to 0.010 inch. As further reflected in FIG. 9, the shim sets 1-8, with each set having its own distinct thickness, are prefabricated specifically for "Joint A", which represents the specific faying joint 18, situated between the nacelle lipskin 12 and the inner barrel 16, depicted in FIGS. 1, 2, 4, and 5.

Figure 10:
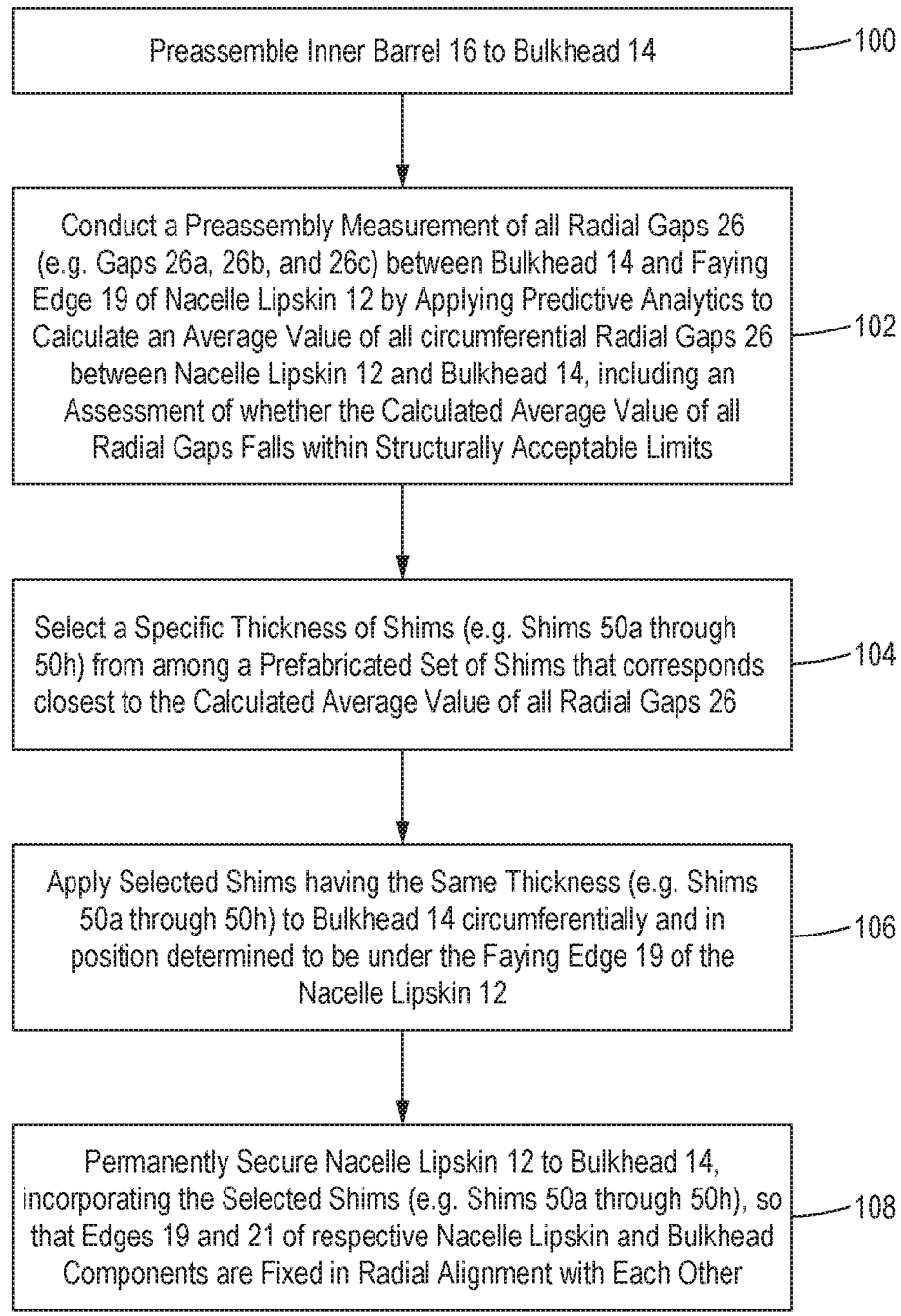
FIG. 10 is a flow chart of a first method of applying an inner barrel and lipskin to a bulkhead, in accordance with the present disclosure.

Referring now to FIG. 10, a first flow chart details several steps of a first method of utilizing flat shims 50a through 50h to achieve the above-described securement of the nacelle lipskin 12 to the bulkhead 14. Step 100 involves first preassembling the inner barrel 16 to the bulkhead 14. Step 102 involves a preassembly measurement of radial gaps 26 (such as those of 26a, 26b, and 26c of FIGS. 2 and 3) between the bulkhead 14 and faying edge 19 of the nacelle lipskin 12. The latter is conducted by applying predictive analytics to calculate an average value of such radial gaps 26 existing circumferentially between the nacelle lipskin 12 and the bulkhead 14. Any predictive analytics model applied would include assessment of whether the calculated average value of all radial gaps falls within any predetermined allowable localized offsets from nominal, so as to fall within structurally acceptable limits.

More specifically, any applied predictive analytics model may involve a preassembly measurement of a lipskin 12, relative to a bulkhead 14 to which the lipskin is to be assembled, by obtaining point data of as-fabricated lipskin surfaces to establish a point cloud surface reflective of that lipskin, as will be appreciated by those skilled in the art. The as-fabricated point cloud surface can then be used to determine whether any relative local waviness (i.e. surface variation) within a faying edge 19 of the as-fabricated lipskin 12 will deflect beyond predetermined limits upon assembly. Such determination could be aided by a computer algorithm for making direct comparison of an actual as-fabricated surface to an averaged shim value (or "shimmed") surface position, thus aiding in prediction of any relative amounts of offset between the as-fabricated and shimmed positions. A structural analysis based on specific design features of the lipskin could be applied to establish predetermined maximum offset limits for any local area of the faying surface 19, the latter having a surface waviness in the as-fabricated condition (the offset being the calculated difference between the faying surface and the shimmed surface position). The shimmed surface position would be determined by calculating how much the surface must be moved or shifted in order to be aligned with a corresponding faying surface 21 of the inner barrel 16. The calculation of difference between an as-measured and an as-fabricated inner barrel 16, and an as-measured and an as-fabricated lipskin 12, in which each is independently measured, and wherein a point cloud surface for each has been determined on a preassembly basis, along with any structural analysis establishing hard deflection limits, would thus always be conducted in advance of actual assembly.

Continuing the description of the flow chart of FIG. 10, in Step 104, a specific shim thickness is selected, from among prefabricated sets 1-8 of shims (FIG. 9) including shims 50a through 50h, that corresponds closest to the calculated average value of all radial gaps 26, including the described representative gaps 26a, 26b, and 26c.

In Step 106, the plurality of selected shims 50a through 50h, all sharing the same specific thickness, is circumferentially applied to the bulkhead 14 in a position prospectively determined to be under the edge 19 of the nacelle lipskin 12.

Finally, in Step 108, the nacelle lipskin 12 is permanently secured to the bulkhead 14, incorporating the shims contained between the latter structures, and in a manner such that the edges 19 and 21 of the respective nacelle lipskin and bulkhead components are fixed in radial alignment with each other.

Figure 11:
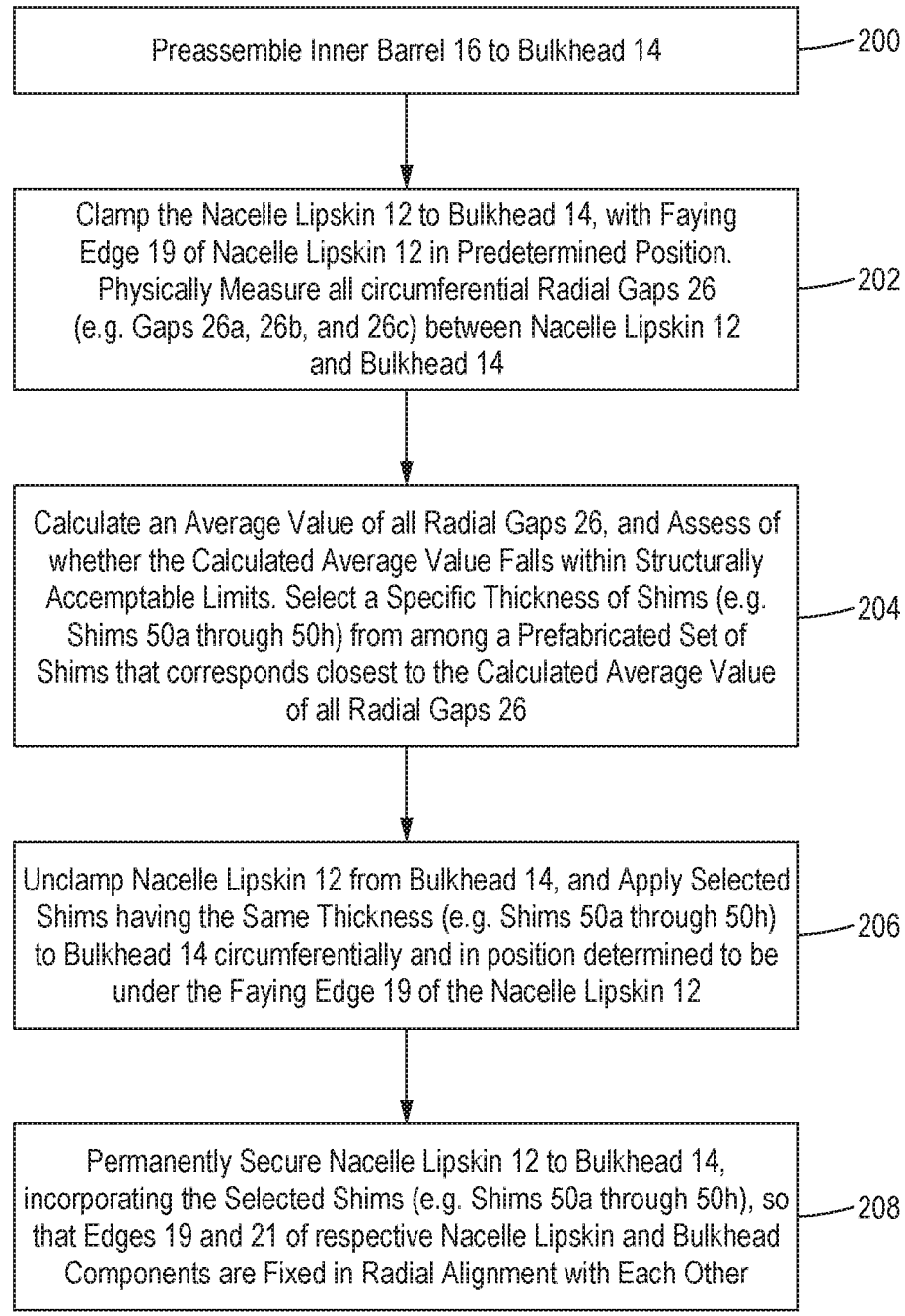
FIG. 11 is second flow chart of a second method of applying an inner barrel and lipskin to a bulkhead, in accordance with the present disclosure.

Referring now to FIG. 11, a second flow chart details several steps of a second method of utilizing flat shims 50a through 50h, which also achieves the above-described securement of the nacelle lipskin 12 to the bulkhead 14. Again, Step 200 involves first preassembling the inner barrel 16 to the bulkhead 14. However, in this second method, no predictive analytics are employed for completing the preassembly measurement of radial gaps 26. Instead, the radial gaps 26 (as represented by gaps 26a, 26b, and 26c of FIGS. 2A through 2C and 3) are physically measured, and an average value of all circumferential radial gaps 26 that exist between the nacelle lipskin 12 and the bulkhead 14 is calculated.

For this purpose, after preassembling the inner barrel 16 to the bulkhead in accordance with Step 200, the Step 202 provides that the nacelle lipskin 12 is physically clamped to the bulkhead 14, with the faying edge 19 of the nacelle lipskin 12 in a predetermined position. All circumferential radial gaps 26 (e.g. gaps 26a, 26b, and 26c) extending between the nacelle lipskin 12 and the bulkhead 14 are physically measured.

In Step 204, the average value of the radial gaps 26 is calculated, and any proposed average calculated value assessed to assure that it falls within structurally predetermined acceptable limits before its acceptance. Thus, even though the nacelle lipskin 12 is physically clamped to the bulkhead 14 in the assembly process of FIG. 11, any as above-described local deflection limit with respect to as-fabricated waviness will still apply. Such deflection limit will be based on the structural analysis of the as-designed part to establish a specific "predetermined deflection limit", even though a "predictive analytics" process including the point cloud surface modeling generation as described in connection with the assembly process of FIG. 10 is not employed. As such, any predetermined deflection limit established by preassembly structural analysis applies to the assembly process of FIG. 11.

Continuing the description of the flow chart of FIG. 11, a shim of a specific thickness is next selected from among prefabricated sets of shims 1-8 (FIG. 9) including the plurality of shims 50a through 50h. The specific shim thickness is selected from one of the sets that corresponds closest to the calculated average value of all radial gaps 26. The average calculated value of all circumferential gaps 26 includes all gaps between lipskin and bulkhead, including the representative gaps 26a, 26b, and 26c earlier described.

In Step 206, the nacelle lipskin 12 is unclamped from the bulkhead 14, and a plurality of selected shims, all sharing the same specific thickness (e g shims 50a through 50h) is next circumferentially applied to the bulkhead 14 in a position prospectively determined to be under the edge 19 of the nacelle lipskin 12.

Finally, Step 208 provides that the nacelle lipskin 12 is permanently secured to the bulkhead 14, incorporating the selected shims between the latter structures in a manner such that the edges 19 and 21 of the respective nacelle lipskin and bulkhead components are fixed in radial alignment with each other.

Figure 12:
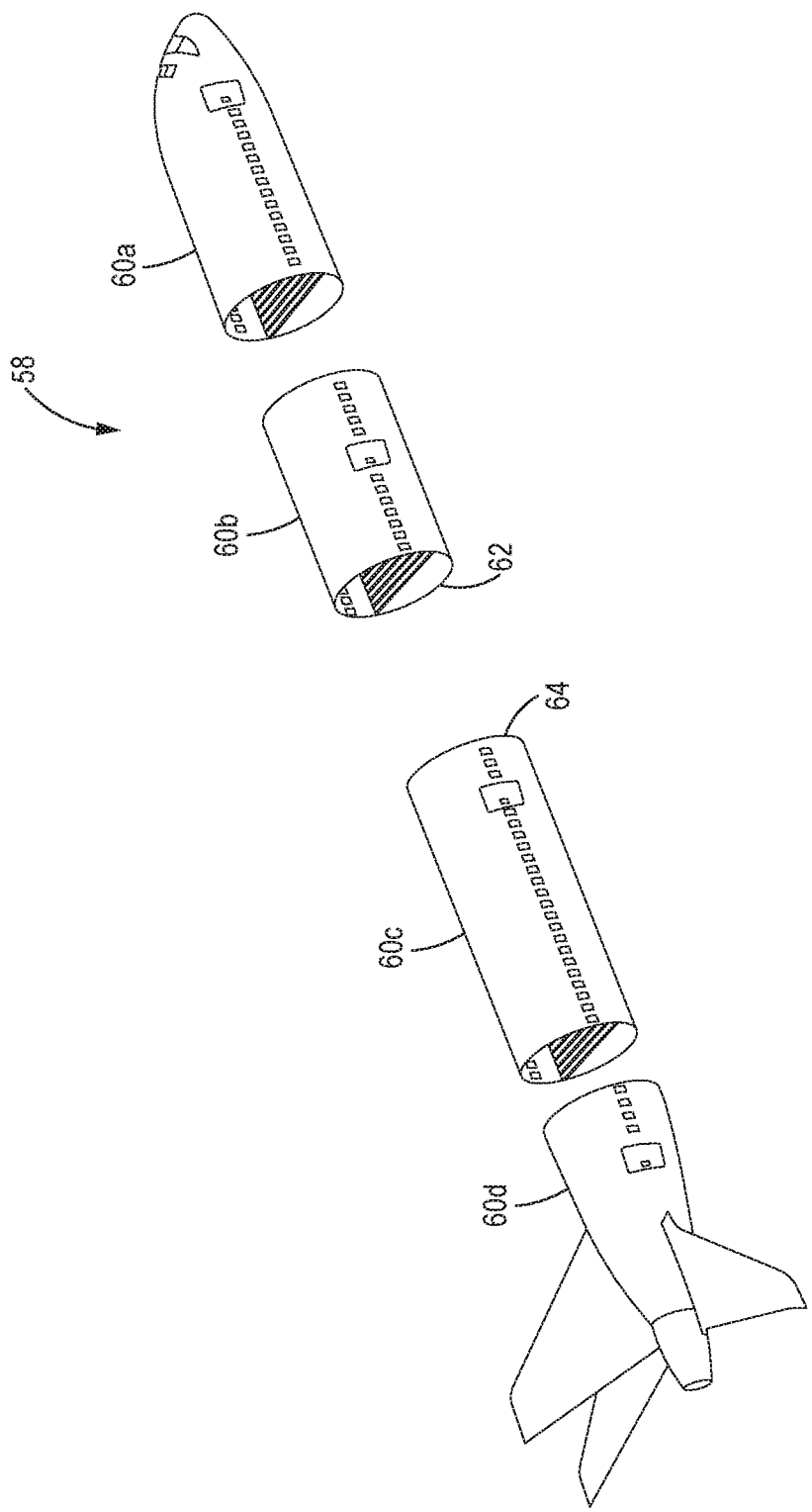
FIG. 12 is a perspective view of fuselage sections, depicting faying joints that may be assembled in accordance with the present disclosure It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

Referring now to FIG. 12, a fuselage 58 is depicted in an exploded view to reveal fuselage sections 60a through 60d. This disclosure may be also applicable to securing butt joint edges 62 and 64 of respective fuselage sections 60b and 60c, for example as applied to interior frame bulkhead structures (not show), as will be appreciated by those skilled in the art.

Although only two specific methods have been described herein, this disclosure may admit to yet other variations and modifications neither described nor suggested. For example, although not described above, computer logic programs may be implemented for conducting any predictive analytics as necessary for carrying out the at least one described method of this disclosure, as will be appreciated by those skilled in the art.

What is claimed is:

1. A method of assembling first and second curvilinear components of an aircraft to a bulkhead having an axis, the first component having a faying edge axially spaced and radially aligned with a faying edge of the second component; the method comprising:
preassembling the first component to the bulkhead;
conducting a preassembly measurement of radial gaps between the bulkhead and the faying edge of the second component without situating the second component about the bulkhead by applying predictive analytics to calculate an average value of radial gaps extending circumferentially between the second component and the bulkhead, wherein the radial gaps are based on point cloud surfaces of the bulkhead and the faying edge of the second component;
selecting a specific shim thickness, from among prefabricated sets of shims, closest to that of one set that corresponds to the calculated average radial gap value;
applying a plurality of shims of the specific thickness selected to the bulkhead in a position prospectively determined to be proximate the faying edge of the second component, each shim spaced circumferentially about the bulkhead; and permanently securing the second component to the bulkhead, in a manner such that the faying edges of the first and second components are fixed in radial alignment with each other.

2. The method of claim one, wherein the first and second components are thin-walled.

3. The method of claim 1, where in the first and second components heavy common axis, and wherein in the bulkhead shares the same axis.

4. The method of claim 1, wherein the first component is formed of a composite, the bulkhead is formed of metal, and the second component is formed of metal.

5. The method of claim 1, wherein the faying edges of the first and second components are axially spaced by 30 to 150 thousandths of an inch.

6. The method of claim 1, wherein the first component is an inner barrel of a turbofan jet engine.

7. The method of claim 1, wherein the inner barrel comprises a chamfer on its faying edge.

8. The method of claim 1, wherein the second component is a nacelle lipskin of a turbofan jet engine.

9. The method of claim 1, wherein from among the plurality of shims of the specific thickness selected from prefabricated sets of shims, each prefabricated set having an incremental thickness variation of 0.005 inch to 0.010 inch.

10. The method of claim 1, wherein conducting the preassembly measurement of radial gaps comprises assessing whether the average value of radial gaps falls within structurally acceptable limits.

11. The method of claim 1, wherein conducting the preassembly measurement of radial gaps comprises obtaining point data of as-fabricated surfaces of the second component to establish the point cloud surface of the faying edge of the second component.

12. The method of claim 11, wherein conducting the preassembly measurement of radial gaps comprises determining whether the faying edge of the second component will deflect beyond predetermined limits upon assembly of the second component to the bulkhead.

\* \* \* \* \*